(12) United States Patent
Scholz et al.

(10) Patent No.: US 6,718,085 B1
(45) Date of Patent: Apr. 6, 2004

(54) STABLE OPTICAL SWITCH WITH REDUCED POWER CONSUMPTION

(75) Inventors: Kenneth D Scholz, Palo Alto, CA (US); John J Uebbing, Palo Alto, CA (US); Julie E Fouquet, Portola Valley, CA (US); Stephan Hengstler, Campbell, CA (US); Tyler Sims, Keizer, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 4 days.

(21) Appl. No.: 10/266,877

(22) Filed: Oct. 7, 2002

(51) Int. Cl.[7] .................................................. G02B 6/42
(52) U.S. Cl. .............................. 385/17; 385/14; 385/16; 385/18; 385/24; 385/39; 385/40; 385/130; 385/131; 385/8; 385/9
(58) Field of Search ............................... 385/14, 16, 17, 385/18, 24, 39, 40, 130, 131, 8, 9

(56) References Cited

U.S. PATENT DOCUMENTS

| | | | |
|---|---|---|---|
| 4,988,157 A | * | 1/1991 | Jackel et al. .................. 385/17 |
| 5,699,462 A | | 12/1997 | Fouquet et al. ................ 385/18 |
| 5,852,689 A | * | 12/1998 | Donald ........................ 385/21 |
| 5,960,131 A | * | 9/1999 | Fouquet et al. ................ 385/17 |
| 6,062,681 A | * | 5/2000 | Field et al. .................... 347/65 |
| 6,327,397 B1 | * | 12/2001 | Schiaffino et al. ............ 385/16 |
| 6,396,972 B1 | * | 5/2002 | O'Rourke et al. ............ 385/17 |
| 6,456,765 B1 | * | 9/2002 | Klocek et al. ................ 385/42 |
| 6,477,222 B1 | * | 11/2002 | Nystrom et al. .............. 378/16 |
| 6,487,333 B2 | * | 11/2002 | Fouquet et al. ................ 385/18 |
| 6,507,682 B2 | * | 1/2003 | Takeuchi et al. .............. 385/16 |
| 6,509,961 B1 | * | 1/2003 | Schroeder .................. 356/73.1 |
| 6,560,383 B1 | * | 5/2003 | Nystrom ...................... 385/16 |
| 6,614,952 B2 | * | 9/2003 | Nishimura ................... 385/17 |

* cited by examiner

*Primary Examiner*—Brian Healy
(74) *Attorney, Agent, or Firm*—Pamela Lau Kee

(57) ABSTRACT

The optical switch operates in two stages. In the first stage, the bubble is "blown" into the trench. In the second stage, the sidewalls are heated to achieve a dry wall condition by improving the thermal transfer path from the heat source to the reflecting wall. Seperate side heaters are placed in thermal contact to the sidewalls. This results in a switch that is more stable, energy efficient, and has a longer mean time to failure.

19 Claims, 5 Drawing Sheets

STABLE OPTICAL SWITCH WITH REDUCED POWER CONSUMPTION

BACKGROUND

Prior art optical switches, such as that disclosed by Fouquet, et al. in U.S. Pat. No. 5,699,462, assigned to Agilent Technologies, operate by the principle of total internal reflection. Two arrays of parallel optical waveguides fabricated in the plane of a transparent dielectric sheet are arranged in a crossing pattern. This sheet is called the PLC. A vertical cavity or "trench" is formed at each cross point with a wall oriented such that when the cavity is empty of fluid, light travelling in one waveguide is transferred to the crossing waveguide by total internal reflection. When a cavity is filled with a fluid having an optical index matching that of the waveguide light passes directly across the trench, re-entering and continuing in the original waveguide without appreciable loss. By this means, light is switched between the continuing waveguide and a crossing waveguide by transferring fluid into or out of the associated trench.

As shown in FIG. 1, fluid transfer is accomplished by heating the fluid with an electrical resistor to generate a bubble within the trench. Heaters are fabricated in an array on a silicon substrate that is positioned parallel to and in alignment with the trench array, separated from it by a narrow gap. This substrate is referred to as the MCC. Hence, a heater is positioned opposite the mouth of each trench. Applying an electrical current to a heater causes nearby fluid to evaporate to form a vapor bubble that expands into the trench, displacing the fluid there and causing light to reflect between crossing channels.

SUMMARY

The present optical switch operates in two stages. In the first stage, the bubble is "blown" into the trench. In the second stage, the sidewalls are heated to achieve a dry wall condition by an improved the thermal transfer path from the heat source to the reflecting wall. Separate side heaters are placed proximate to a direct thermal path to the sidewalls. This results in a switch that is more stable, energy efficient, and has a longer mean time to failure.

Generally, there are two types of heaters: central and side. The central heater applies heat to create a bubble. The side heaters apply heat through a direct thermal path to dry the sidewalls. In a first embodiment, the side heaters are in direct contact with the waveguide substrate. The side and central heaters may be constructed on separate substrates. In a second embodiment, the side heaters reside on the silicon substrate. The direct thermal path may be a separate thermal stud in contact with the silicon and waveguide substrates or a thermal stud integrated into the waveguide substrate.

DETAILED DESCRIPTION

Figure 2:
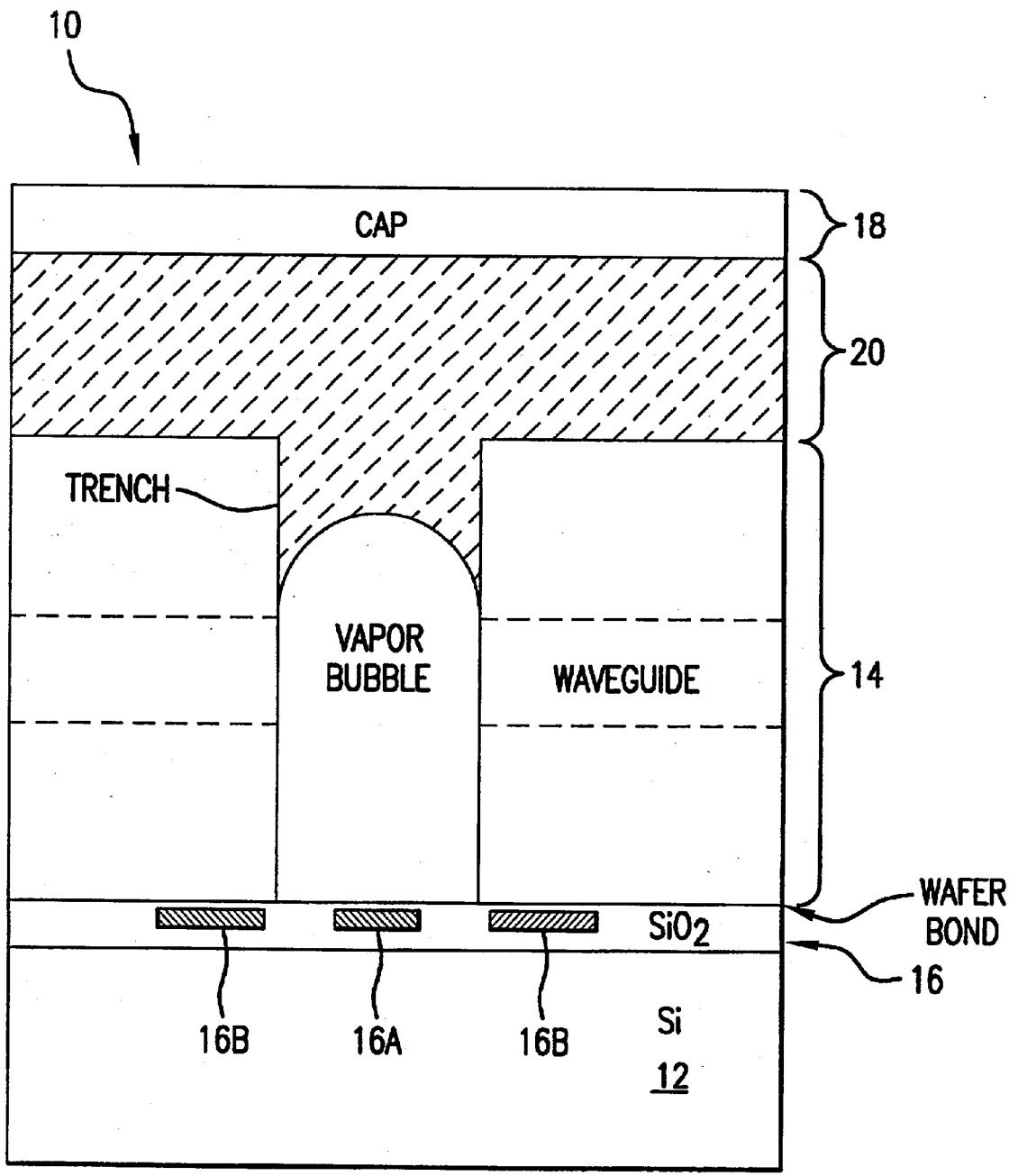
FIG. 2 illustrates a gapless switch of the present invention.

With reference to FIG. 2, a "gapless switch" of the present invention, an optical switch 10 is shown as being formed on a substrate 12. The substrate 12 is preferably silicon, but other materials, e.g. $SiO_2$, $Si_3N_4$, SiC, $Al_2O_3$, SOI wafers, and quartz. The advantages of silicon substrate is that it facilitates the use of integrated circuit fabrication techniques to form the optical switch, and it can be etched through to form channels for fluid flow perpendicular to the plane of the substrate.

The optical switch 10 includes a planar waveguide 14 defined by a lower cladding layer, a core, and an upper cladding layer. During fabrication, a core layer of material is deposited and etched to form two intersecting waveguides or a crosspoint. The ends of the waveguide segments intersect at the gap. The switch 10 is a single switching element in an array of switches. The trench is etched so that an input segment of the first waveguide is aligned for transmission to an output segment of the same waveguide, while an input segment of the second waveguide is aligned for transmission to an output segment of the second waveguide.

A heater substrate 16 is formed on a silicon substrate 12 that has a bondable top layer. The heater substrate 16 is arranged such that at each crosspoint, there are two types of heaters: central 16A and side 16B. The layers of the heater substrate 16 may optionally include active control electronics (not shown).

The waveguide pattern 14 is aligned face to face with the heater substrate 16. The substrates can be bonded by one of several methods that include anodic bonding, fusion bonding, or soldering.

The trenches are opened by removing the bulk of the substrate thickness, e.g. chemical machine polishing, etching (wet or dry), laser etching, or laser ablation. A cap 18 is positioned above the trenches to form a plenum 20. The plenum 20 is filled with fluid. The switch element is connected to the fluid pressure control apparatus, optical fibers, and temperature control apparatus.

Figure 1:
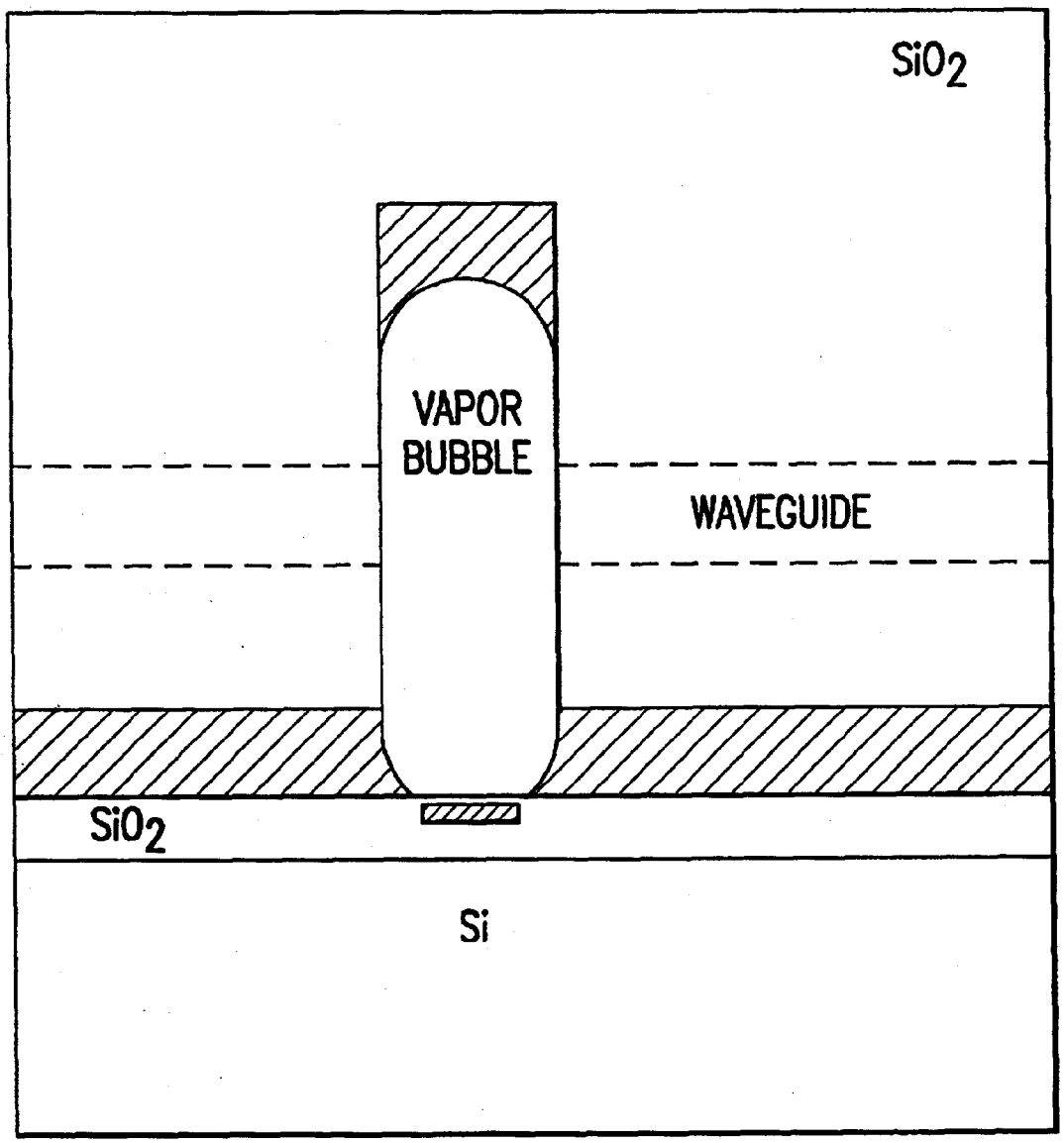
FIG. 1 illustrates an optical switch of the prior art.

The reduced heater power required to achieve a stable, dry wall condition results from the more efficient heat path provided by the direct physical contact between the surface of the heater chip and the waveguide layers. As compared to the prior art shown in FIG. 1, the gap between the heater substrate and waveguide is eliminated and the fluid distribution function formerly accomplished by the gap is moved to the plenum formed above the waveguide. Additionally, heat studs could be used instead of wafer bonding. With this difference, global pressure and temperature control can be regulated on either end of the vertical trench. This is used to control bubble initiation and collapse. It is also used to lower power needs for operation for the resistor as well as facilitating system filling, purging, and regulation.

This embodiment, shown in FIG. 2, may be enhanced or optimized by modification of the heater geometry of addition of separate heaters so as to better couple heat to the trench walls. This may be accomplished by enlarging the heaters or placing them closer to the trench walls, adding passive thermally conductive layers such as a metal to further reduce thermal resistance between the heater and the walls, or by adding a separate heater element positioned under the side wall.

Figure 3:
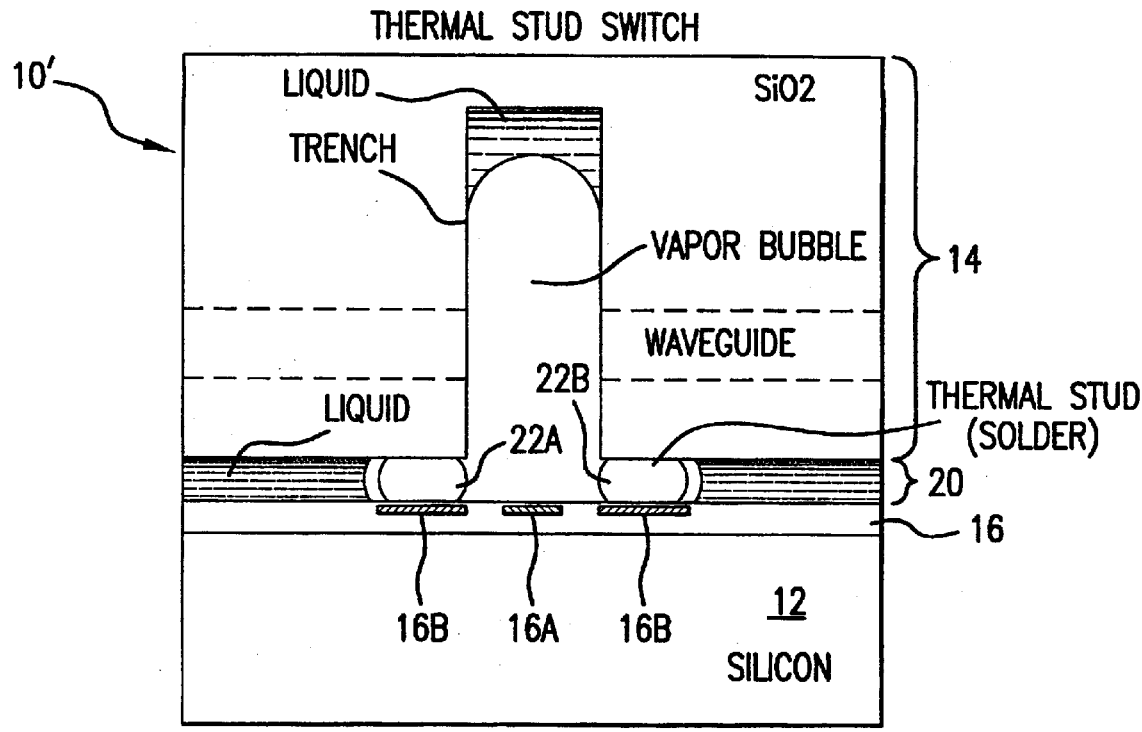
FIG. 3 illustrates a thermal stud switch embodiment of the present invention.

FIG. 3 illustrates a "thermal stud switch" of the present invention 10'. A plenum 20 is formed between the planar waveguide 14 and heater substrate 16. Within the plenum 20, an array of thermal studs is in direct thermal contact with the planar waveguide 14 and heater substrate 16. A pair of thermal studs 22A, 22B is positioned at each crosspoint.

Thermal contact between the heater substrate 16 and the waveguide trench walls is enhanced by the formation of gap bridging "thermal studs" 22A, 22B that provide direct thermally conductive paths between the heaters 16A, 16B and the trench walls. These studs 22A, 22B are made of a suitable thermal conductive material. These thermally conductive material include solder, silver, gold, composites of solder, composites of gold, composites of silver, alloys of solder, alloys of gold, alloys of silver, electroplates of gold, electroplates of silver, electroplates of solder, SiC, and sputtered silicon.

In the case of solder pads, one or both of the surfaces that the solder contact is metallized with solderable layers similar to those used to form the ring seal and solder is deposited on one or both surfaces. The solder melts during the PLC to MCC bonding process, forming a direct thermal bond between the surfaces.

Soldering to both surfaces accommodates variation in gap thickness occurring either at initial assembly or subsequently with thermal cycling or aging. If gold studs or solder pads connect to only one surface, thermal contact may be maintained by application of a clamping pressure.

Figure 4:
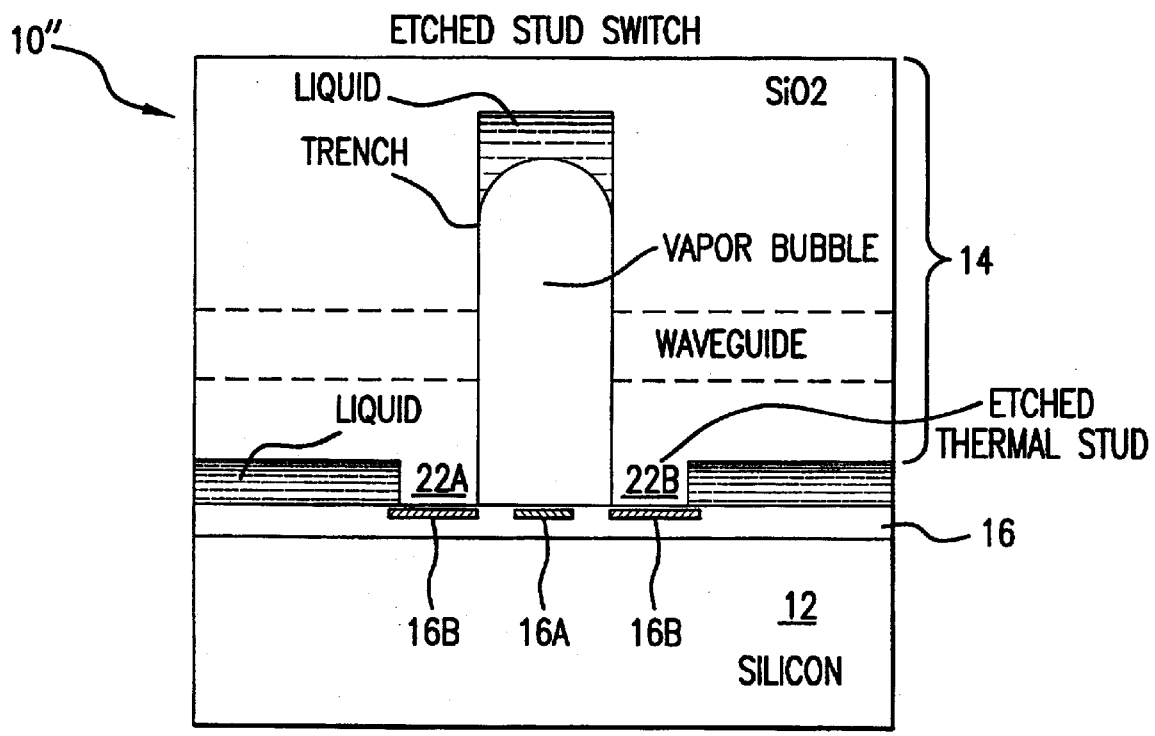
FIG. 4 illustrates an etched stud switch embodiment of the present invention.

FIG. 4 illustrates an "integrated thermal stud switch" 10″ of the present invention. While the thermal studs 22A, 22B are shown integrated into the waveguide substrate 14, the concept can be extended to the heater substrate 16.

The thermal contact between the trench walls in the planar waveguide 14 and the heaters in the heater substrate 16 can be enhanced by locally reducing or eliminating the gap in the immediate vicinity of the reflecting trench wall while providing sufficient gap or channels for fluid transport at other locations around the trench opening. This is accomplished by etching relief into either the planar waveguide or heater substrate surfaces to accommodate the fluid flow. Contact pressure can be provided from the geometry of the structure, such as by shrinkage of the solder seal upon solidification, or by application of external clamping force or pressure. Efficient heat transfer at the contact surfaces also can be enhanced by local metallization of the surfaces.

Figure 5:
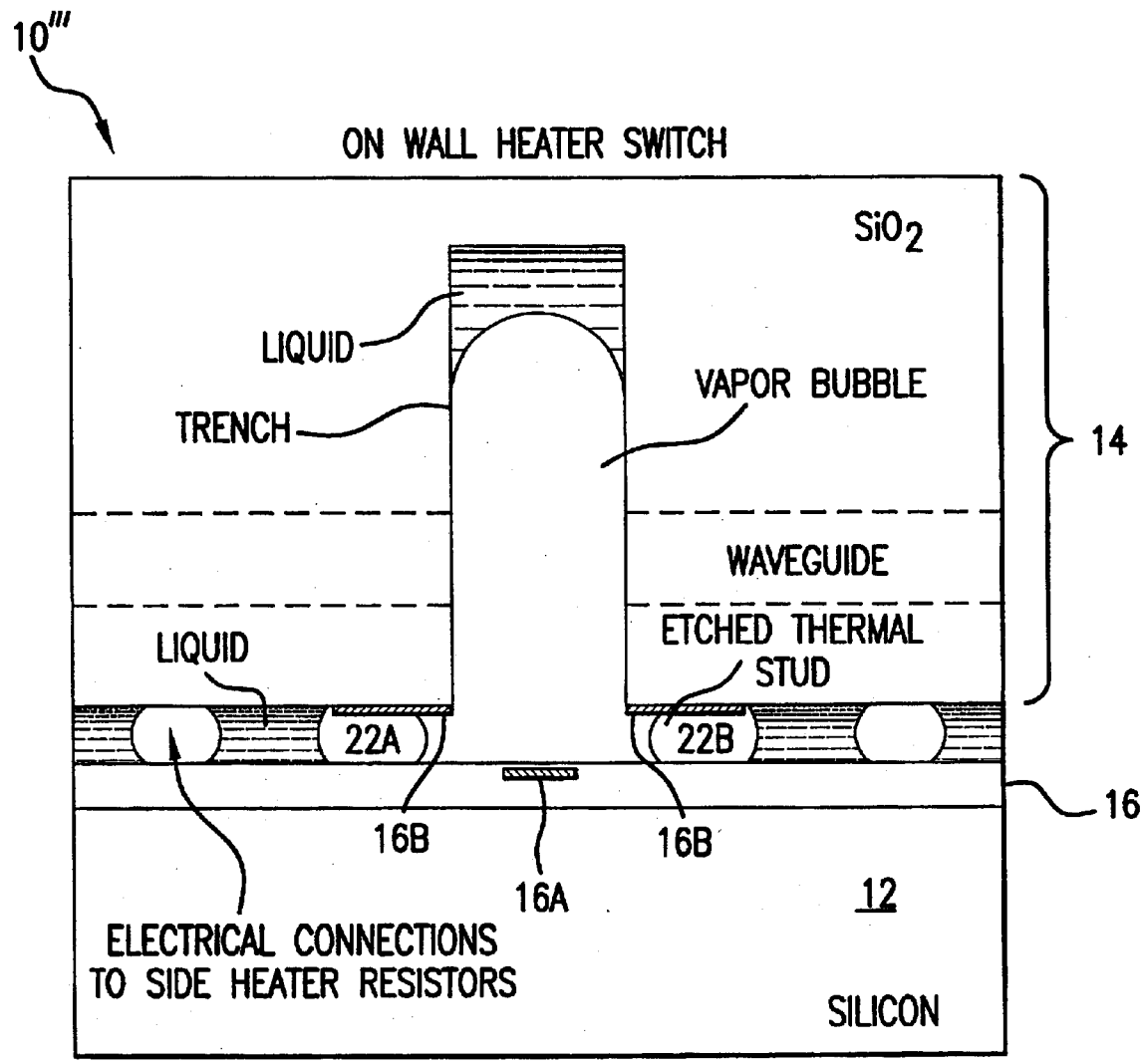
FIG. 5 illustrates an on wall heater switch embodiment of the present invention.

FIG. 5 illustrates an embodiment 10‴ wherein the side heaters 16B are fabricated in or on the planar waveguide 14 in close thermal contact with the trench walls. As an example, a heater may be fabricated on the face of the planar waveguide 14 immediately adjacent to the edge of the trench. A variety of heater geometries may be used ranging from a single heater located on the reflecting wall side of the trench to dual heaters placed on the surface at each side of the trench to a single heater fabricated to wrap around the trench. Heater fabrication can be by conventional thin film vapor deposition and patterning techniques. Electrical connection to the resistive heaters can be made by a surface mount type technology such as solder bumps. Such PLC mounted heaters may be used whether individually or in combination with the embodiments disclosed in FIGS. 2–4.

Figure 6:
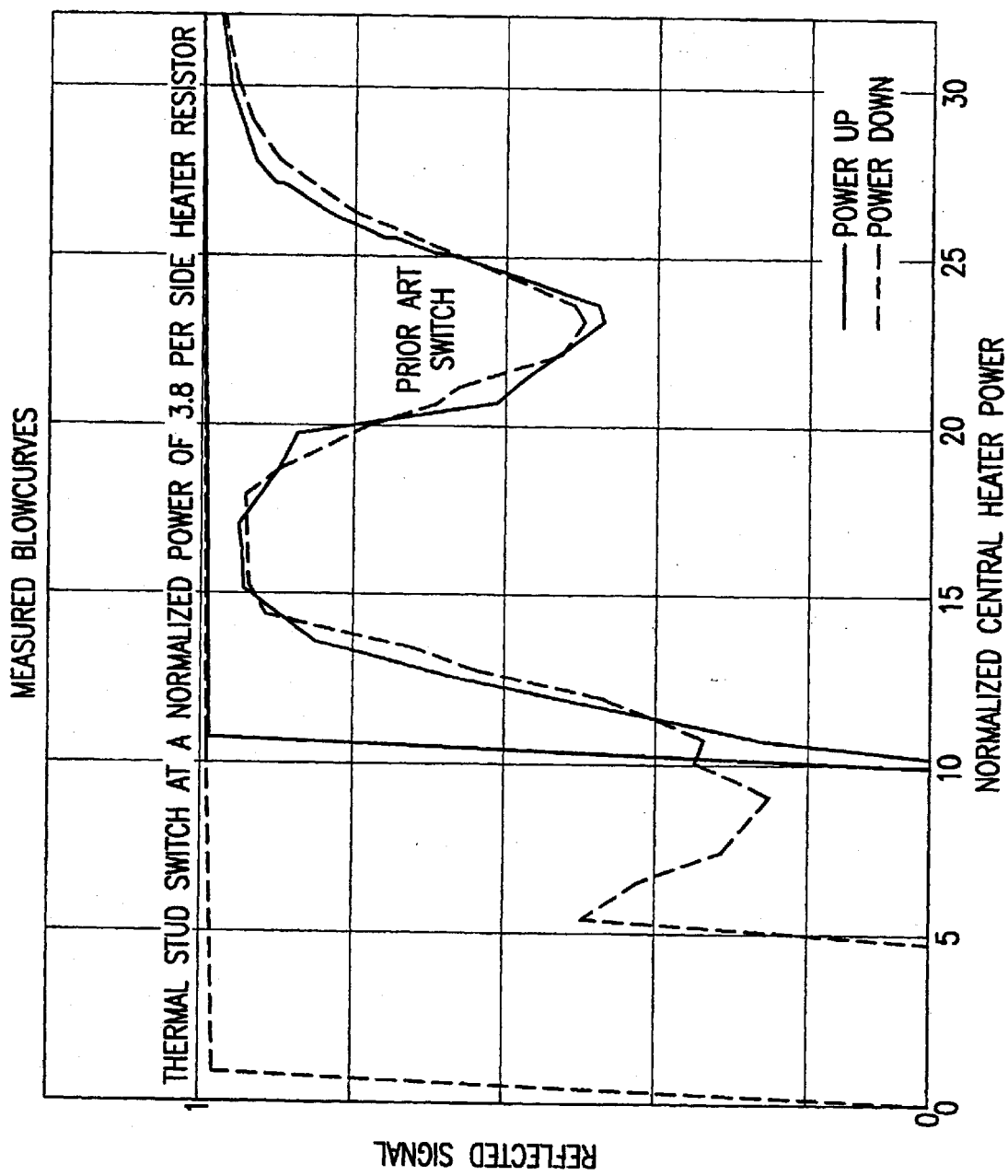
FIG. 6 is a plot of reflected signal as a function of power applied to the heater for the optical switch shown in FIG. 2.

FIG. 6 is a blowcurve plot of reflected signal as a function of normalized power applied to the heaters. The "stepped" curve corresponds to the novel optical switch while the "analog" curve corresponds to the prior art optical switch. The absolute power has been normalized with respect to fluid pressure.

In the prior optical switch, as the heater power increases from zero, the reflected intensity goes through four stages: initiation, a first drying of the walls, recondensation, and a second drying of the walls. The initial lower power peak is associated with an operation condition in which a thin film of condensed fluid wets the reflecting wall of the trench. The stable region achieved at high heater power is associated with complete drying of the trench wall in the vicinity of the crossing waveguides. The heaters positioned opposite the openings of the trenches arc the sole source of this heat and the design is such that the transfer of heat from the heater, across the gap, and to the trench walls is relatively inefficient. The prior art switch requires a minimum of 32 of normalized power to achieve a stable "dry wall" condition. This requires operating the heaters at a higher power than is desirable, thus increasing the mean time to failure of the switch.

In the present optical switch, the "dry wall" condition is achieved when the reflecting wall is heated to a temperature slightly above that of the bubble temperature of the fluid, the bubble temperature being determined by the physical properties of the fluid and the ambient pressure within the device. The "dry wall" condition is achieved in two stages: initiation and drying of the walls. In terms of normalized power, the central heater resistor has an operating point of about 12 and side heater resistor has an operating point of 3.8. To achieve a stable "dry wall" condition, approximately 20 of normalized power is applied. This novel thermal stud switch shows a marked decrease in power consumption compared to the prior art central heater switch.

We claim:

1. A switching element for use along an optical path comprising:
   a waveguide substrate having at least two optical waveguide segments on a first surface, including first and second waveguide segments having trenches etched so that the ends intersect at a crosspoint, the first and second waveguide segments being in fixed relation and generally parallel to the first surface;
   a heater substrate joined to the waveguide substrate such that a central heater is positioned within the crosspoint and at least one sidewall heater is positioned at the perimeter of the crosspoint, wherein the sidewall heater is operative to dry the walls during switching operation;
   the crosspoint having a trench with parallel walls;
   an array of thermal studs, each stud in direct thermal contact with the sidewall heater and one of the parallel walls of the trench;
   a plenum interposing the waveguide substrate and the heater substrate; and
   a liquid disposable within the plenum and the trench, the liquid being responsive to the central heater and the at least one sidewall heater, wherein optical transmission from the first waveguide segment to the second waveguide segment is determined by absence of the liquid within the trench.

2. An optical switch, as defined in claim 1, wherein the array of thermal studs is integrated into the waveguide substrate.

3. An optical switch, as defined in claim 1, wherein the array of thermal studs is integrated into the heater substrate.

4. An optical switch, as defined in claim 1, wherein the array of thermal studs is of a conductive material.

5. An optical switch, as defined in claim 4, wherein the conductive material is selected from a group that includes solder, silver, gold, composites of solder, composites of gold, composites of silver, alloys of solder, alloys of gold, alloys of silver, electroplates of gold, electroplates of silver, electroplates of solder, SiC, and sputtered silicon.

6. An optical switch, as defined in claim 1, wherein a stable dry wall condition is achieved when less than 20 normalized power is applied to the central heater and the at least one sidewall heater.

7. A switching element for use along an optical path comprising:
   a waveguide substrate having at least two optical waveguide segments on a first surface, including first and second waveguide segments with trenches etched so that the ends intersect at a crosspoint, the first and second waveguide segments being in fixed relation and generally parallel to the first surface, at least one sidewall heater is positioned at the perimeter of the crosspoint, wherein the sidewall heater is operative to dry the walls during switching operation;
   a heater substrate joined to the waveguide substrate such that a central heater is positioned within the crosspoint;
   electrical contacts, connecting the sidewall heater to the heater substrate;
   a plenum interposes the waveguide substrate and heater substrate; and
   a liquid disposable within the plenum and the trench, the liquid being responsive to the central heater, wherein optical transmission from the first waveguide segment to the second waveguide segment is determined by absence of the liquid within the trench.

8. The optical switch as defined in claim 7, wherein the electrical contacts are solder bumps.

9. An optical switch, as defined in claim 7, wherein the array of thermal studs is integrated into the waveguide substrate.

10. An optical switch, as defined in claim 9, wherein the array of thermal studs is integrated into the heater substrate.

11. An optical switch, as defined in claim 9, wherein the array of thermal studs is of a conductive material.

12. An optical switch, as defined in claim 11, wherein the conductive material is selected from a group that includes solder, silver, gold, composites of solder, composites of gold, composites of silver, alloys of solder, alloys of gold, alloys of silver, electroplates of gold, electroplates of silver, electroplates of solder, SiC, and sputtered silicon.

13. An optical switch, as defined in claim 9, wherein a stable dry wall condition is achieved when less than 20 normalized power applied to the central heater and the at least one sidewall heater.

14. A switching element for use along an optical path comprising:
   a waveguide substrate having at least two optical waveguide segments on a first surface, including first and second waveguide segments having trenches etched so that the ends intersect at a crosspoint, the first and second waveguide segments being in fixed relation and generally parallel to the first surface;
   a heater substrate joined to the waveguide substrate such that a central heater is positioned within the crosspoint and at least one sidewall heater is positioned at the perimeter of the crosspoint, wherein the sidewall heater is operative to dry the walls during switching operation;
   the crosspoint having a trench with parallel walls;
   an array of thermal studs, each stud in direct thermal contact with the sidewall heater and one of the parallel walls of the trench;
   a cap positioned above the waveguide forming a plenum; and
   a liquid disposable within the plenum and the trench, the liquid being responsive to the central heater, wherein optical transmission from the first waveguide segment to the second waveguide segment is determined by absence of the liquid within the trench.

15. An optical switch, as defined in claim 14, wherein the array of thermal studs is integrated into the waveguide substrate.

16. An optical switch, as defined in claim 14, wherein the array of thermal studs is integrated into the heater substrate.

17. An optical switch, as defined in claim 14, wherein the array of thermal studs is of a conductive material.

18. An optical switch, as defined in claim 17, wherein the conductive material is selected from a group that includes solder, silver, gold, composites of solder, composites of gold, composites of silver, alloys of solder, alloys of gold, alloys of silver, electroplates of gold, electroplates of silver, electroplates of solder, SiC, and sputtered silicon.

19. An optical switch, as defined in claim 14, wherein a stable dry wall condition is achieved when less than 20 normalized power is applied to the central heater and the at least one sidewall heater.

* * * * *